(12) United States Patent
Li et al.

(10) Patent No.: US 10,086,469 B2
(45) Date of Patent: Oct. 2, 2018

(54) MECHANICAL DIMPLING FOR VAPOR EXPRESSION IN WELDING

(71) Applicant: GM GLOBAL TECHNOLOGY OPERATIONS LLC, Detroit, MI (US)

(72) Inventors: Huaxin Li, Rochester Hills, MI (US); Justin A. Wolsker, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 389 days.

(21) Appl. No.: 14/845,675

(22) Filed: Sep. 4, 2015

(65) Prior Publication Data
US 2017/0066076 A1    Mar. 9, 2017

(51) Int. Cl.
| B23K 20/10 | (2006.01) |
| B23K 26/22 | (2006.01) |
| B23K 26/322 | (2014.01) |
| B23K 26/16 | (2006.01) |
| B23K 20/227 | (2006.01) |

(Continued)

(52) U.S. Cl.
CPC ............ *B23K 20/10* (2013.01); *B23K 20/227* (2013.01); *B23K 20/24* (2013.01); *B23K 26/16* (2013.01); *B23K 26/22* (2013.01); *B23K 26/322* (2013.01); *B23K 26/60* (2015.10); *B23K 2203/04* (2013.01); *B23K 2203/08* (2013.01); *B23K 2203/166* (2015.10)

(58) Field of Classification Search
CPC ...... B23K 20/10; B23K 26/22; B23K 26/322; B23K 26/16; B23K 20/227; B23K 20/24; B23K 26/60
USPC .................................................... 219/121.64
See application file for complete search history.

(56) References Cited

U.S. PATENT DOCUMENTS

| 5,454,480 A * | 10/1995 | Morris, Jr. ............. B60K 15/03 220/4.14 |
| 2015/0306708 A1* | 10/2015 | Pape .................. B23K 26/0876 219/121.64 |

FOREIGN PATENT DOCUMENTS

CN          201855861 U       6/2011

OTHER PUBLICATIONS

Hongping Gu, Laser Lap Welding of Zinc Coated Steel Sheet with Laser-Dimple Technology; AIP-Journal of Laser Applications; http://scitation.aip.org/content/lia/journal/jla/22/3/10.2351/1.3485596.

(Continued)

*Primary Examiner* — Samuel M Heinrich
(74) *Attorney, Agent, or Firm* — Cynthia R. Parks; Parks IP Law LLC

(57) ABSTRACT

A method for welding together two workpieces. The method includes stamping, using a stamping system, a first workpiece comprising a material that creates vapor when melted, such as zinc. The first workpiece is stamped at a first preselected region to form a plurality of depressions in the first preselected region. The method further includes positioning the first preselected region adjacent a second preselected region of a second workpiece. After stamping and positioning as such, the method includes applying energy to at least one of the first preselected region and the second preselected region to melt material of the first and second workpieces to form a joint connecting together the first and second workpieces. Based on the configuration and arrangement created, any vapor formed by molten material vents from the joint being formed, between the depressions formed, and away from the first and second workpieces.

20 Claims, 8 Drawing Sheets

(51) Int. Cl.
    *B23K 20/24*     (2006.01)
    *B23K 26/60*     (2014.01)
    *B23K 103/16*     (2006.01)
    *B23K 103/04*     (2006.01)
    *B23K 103/08*     (2006.01)

(56) References Cited

OTHER PUBLICATIONS

Fffice Action in corresponding Chinese application dated Jan. 3, 2018.

\* cited by examiner

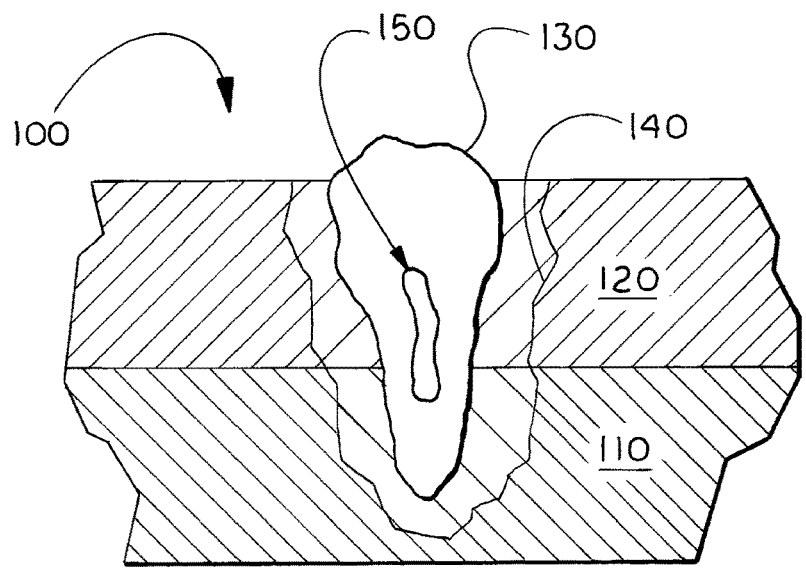
Fig_1
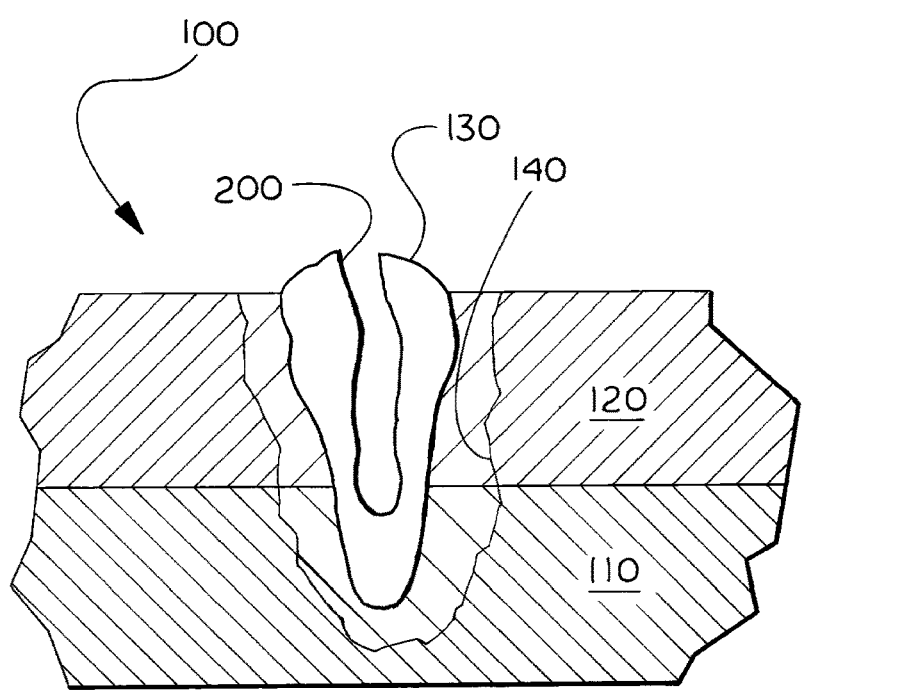
Fig_2

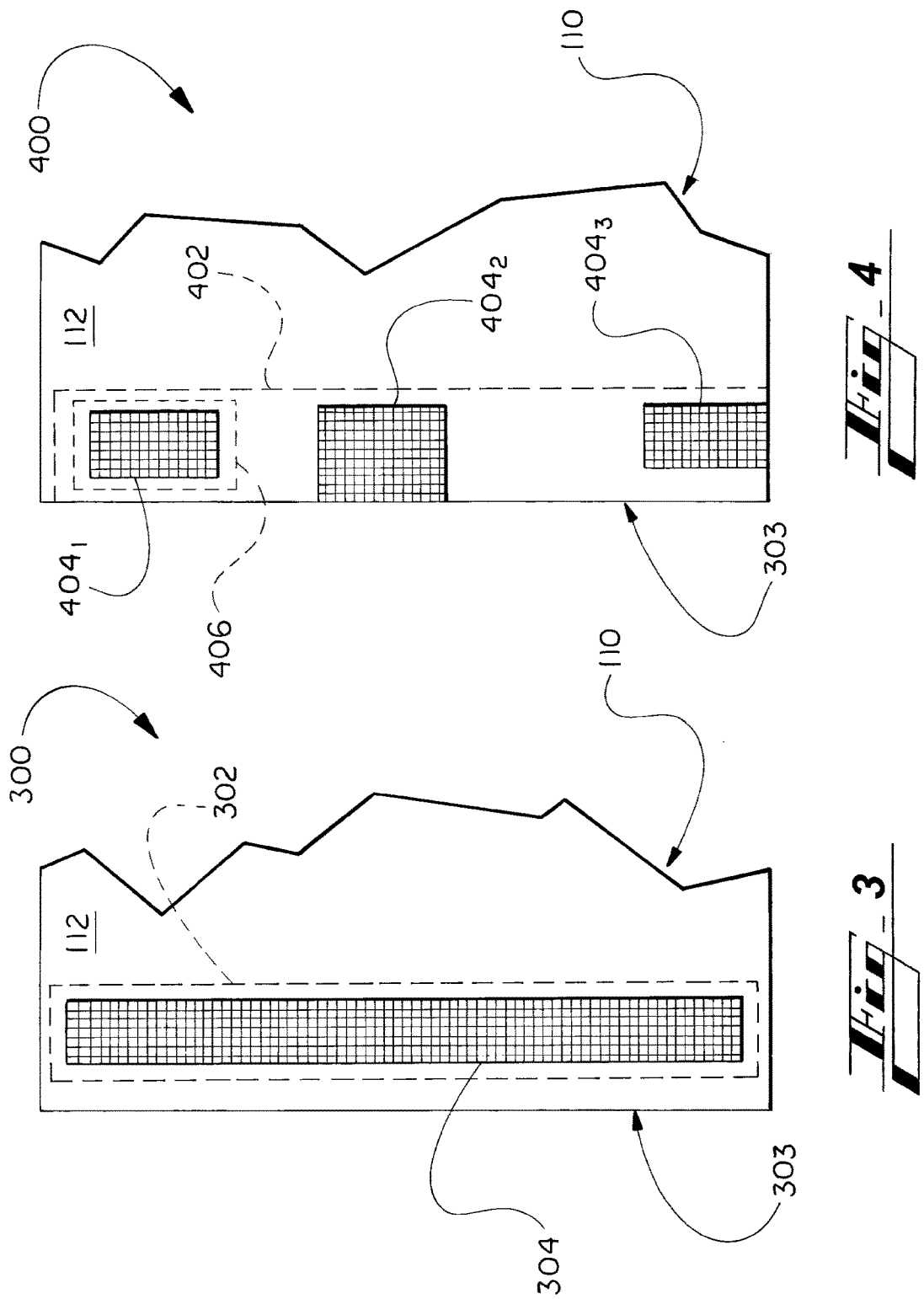

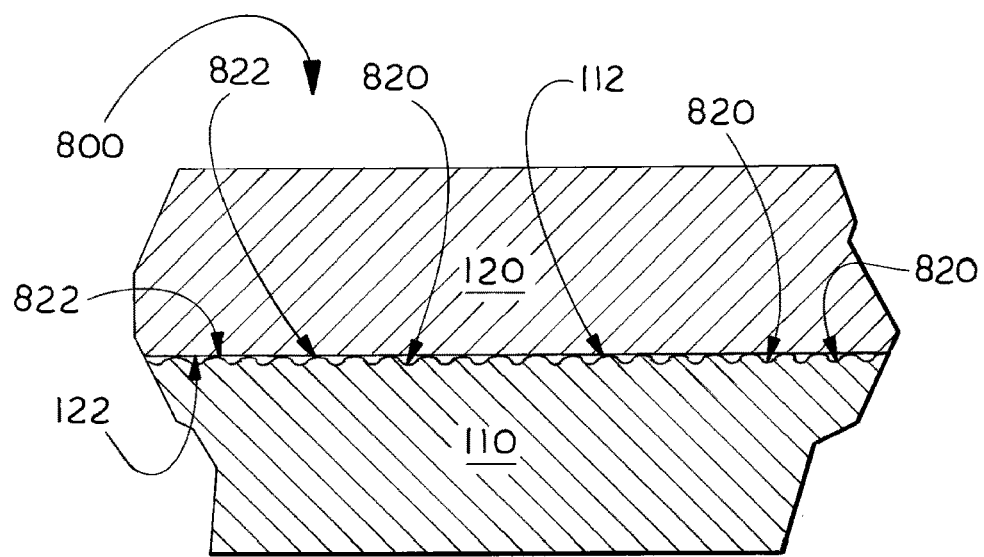
Fig_8
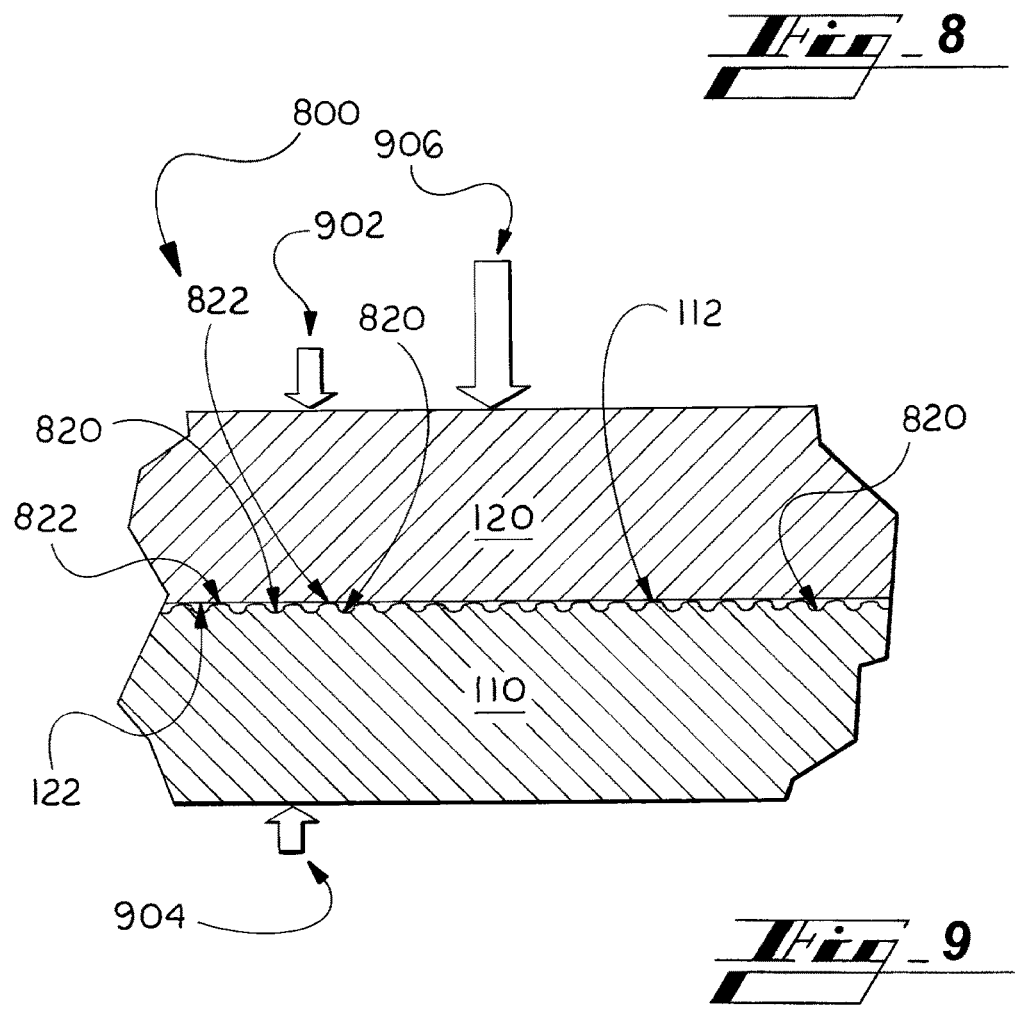
Fig_9

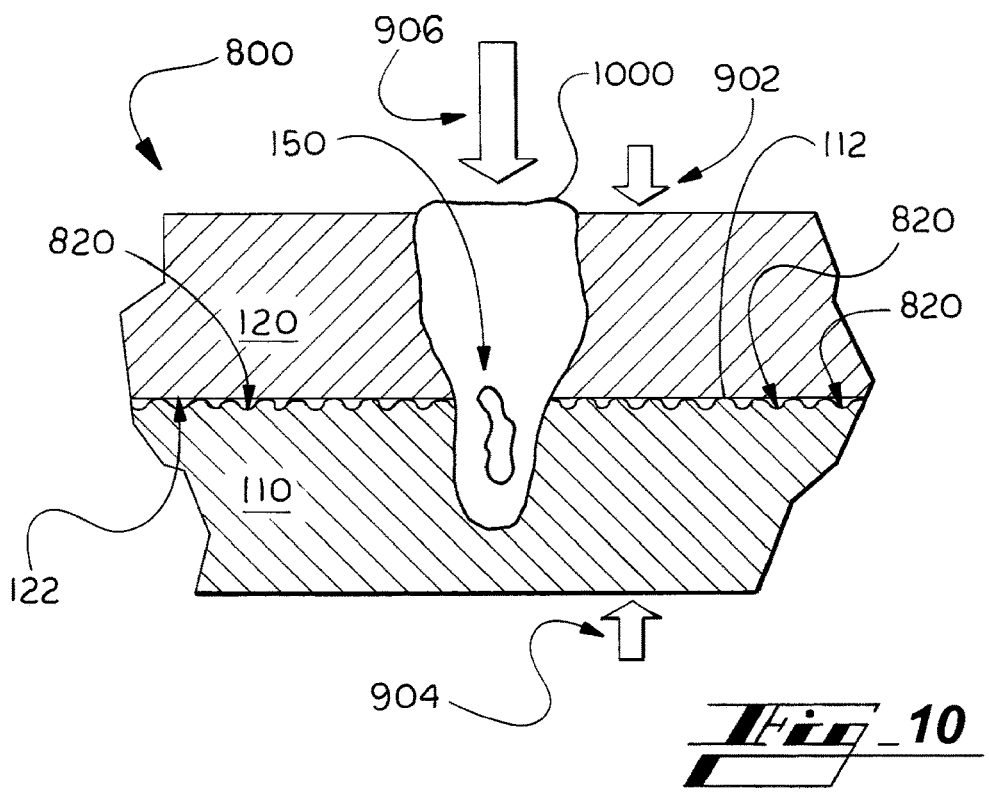
_Fig_10
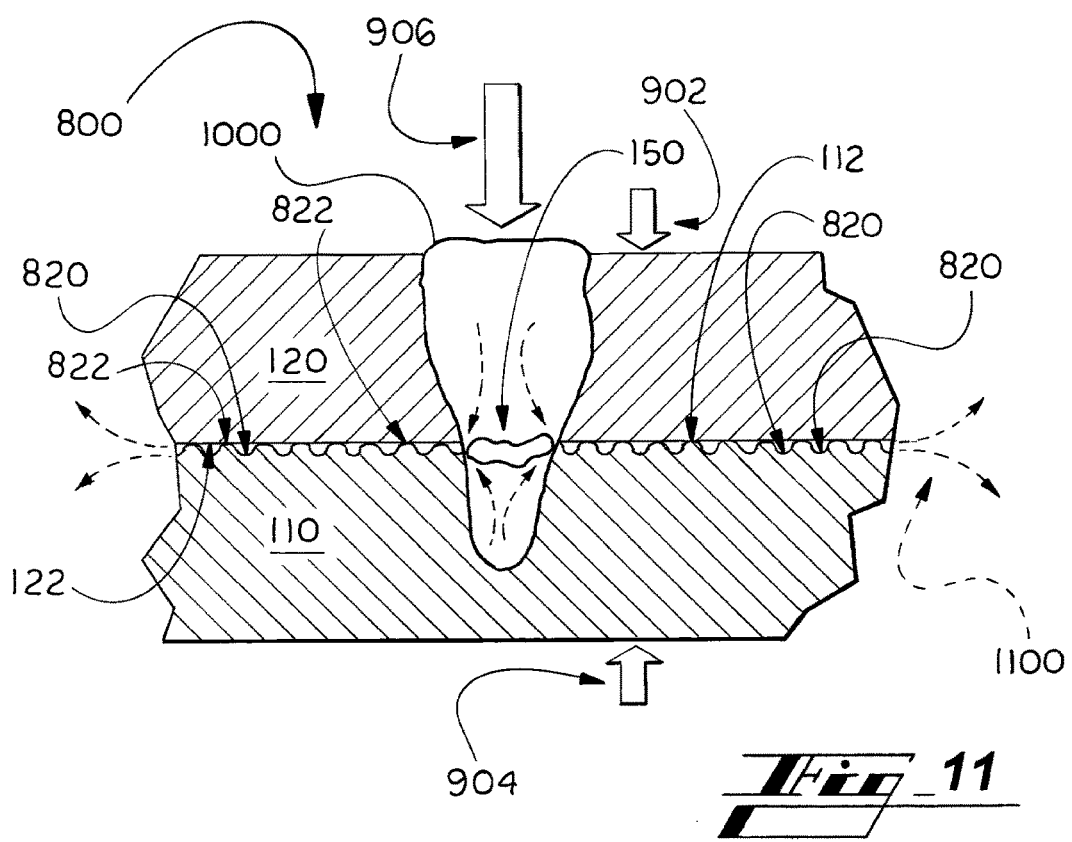
_Fig_11

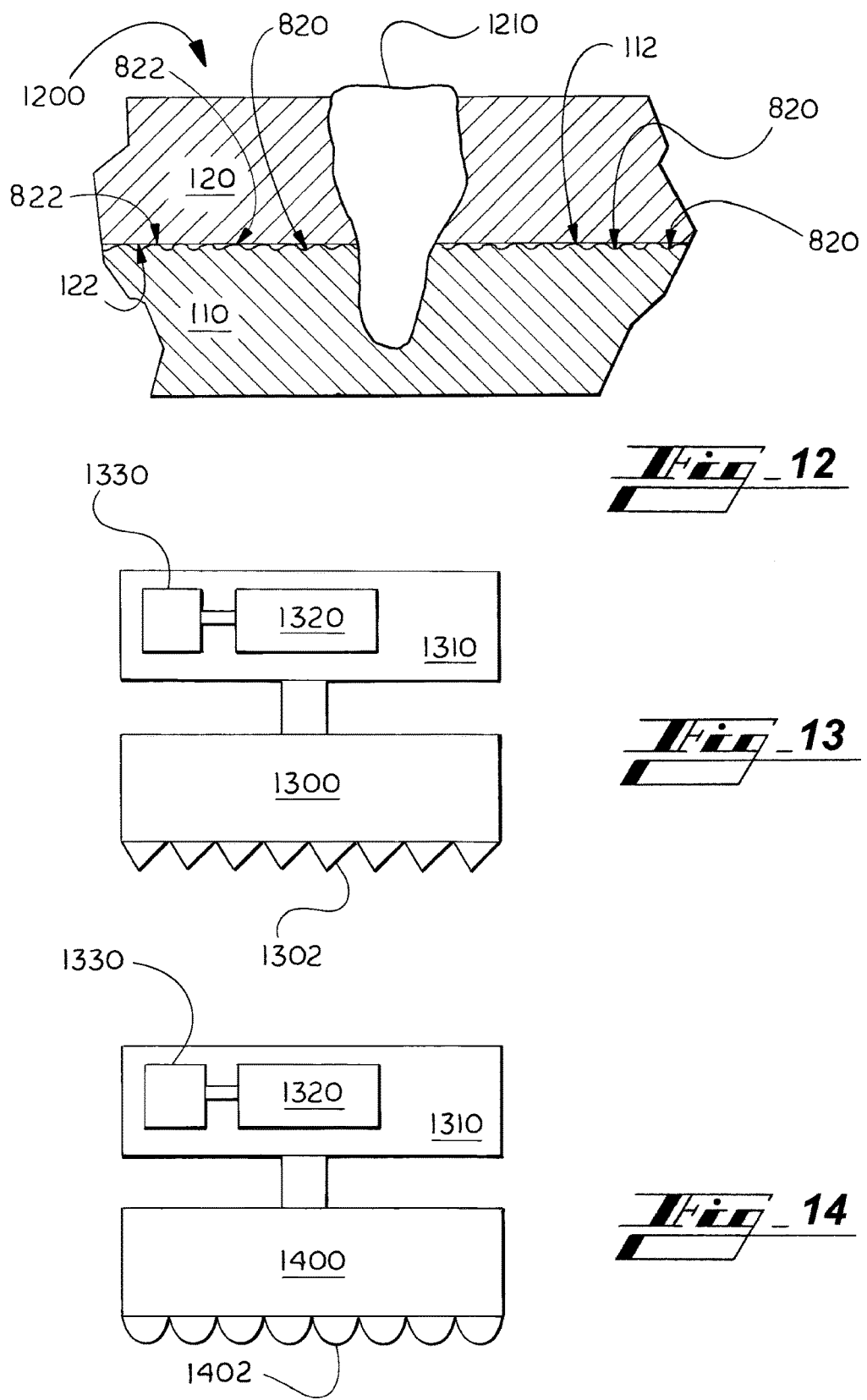

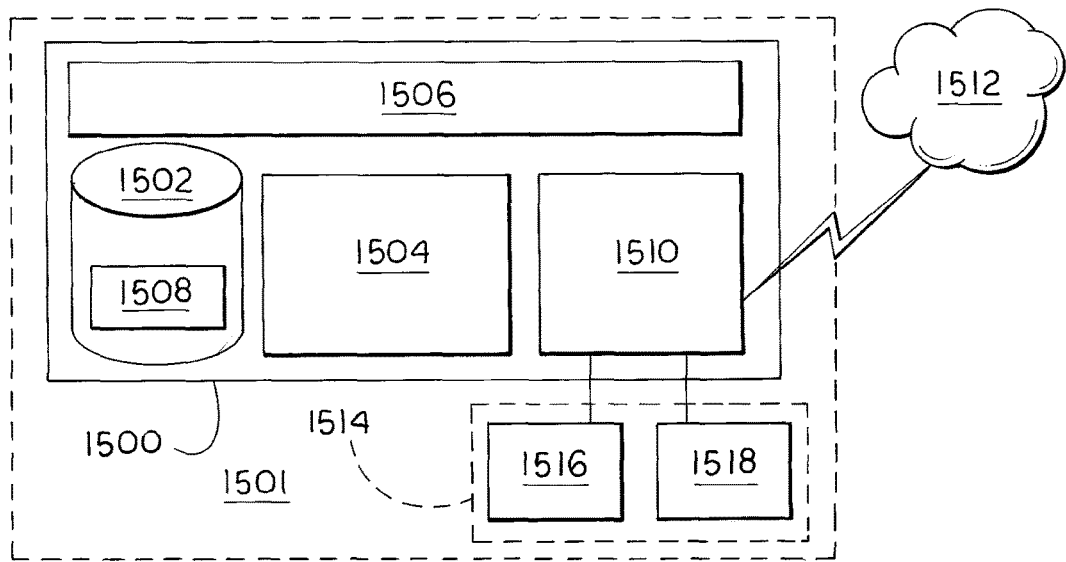
Fig_15
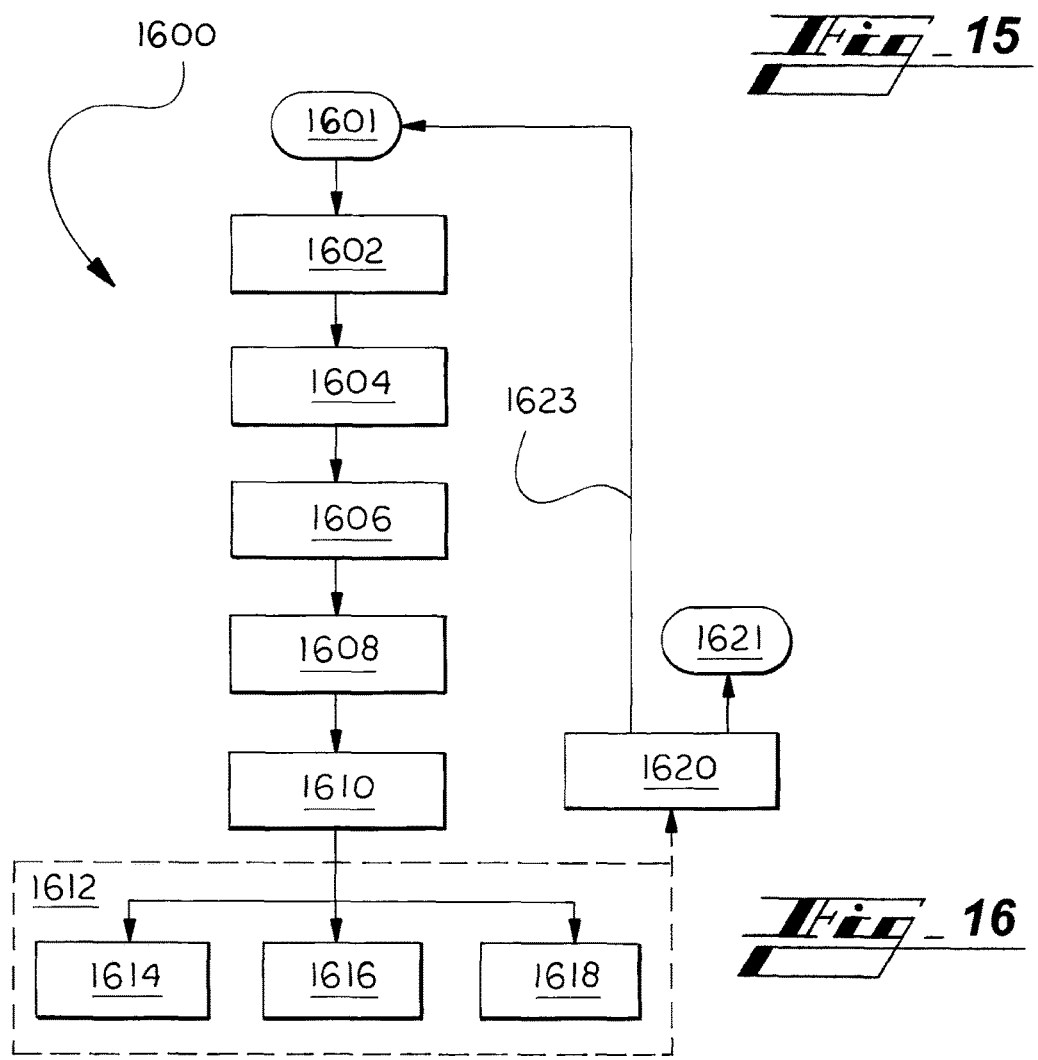
Fig_16

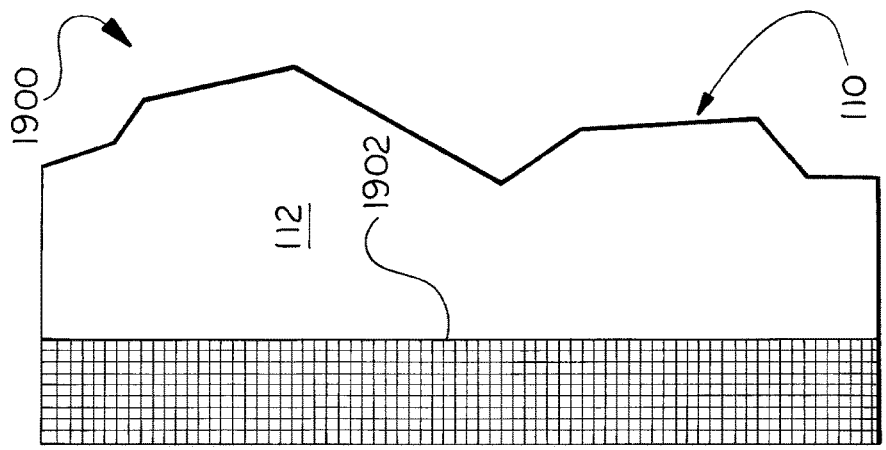
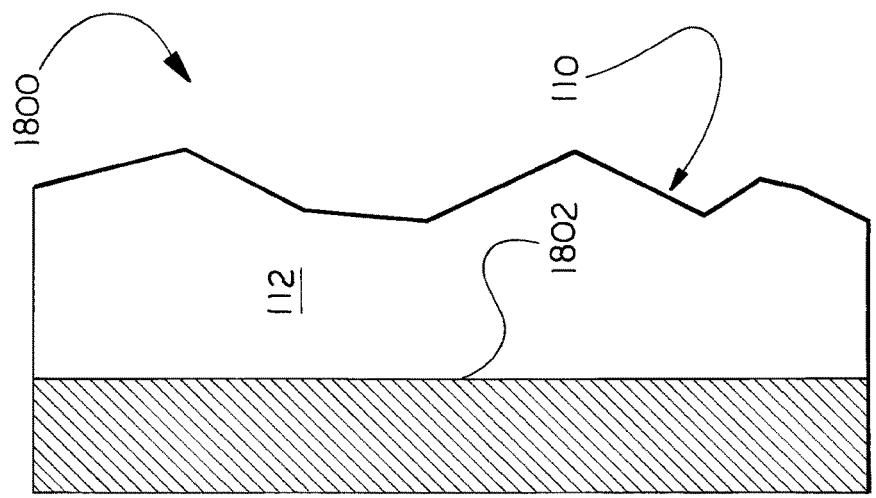
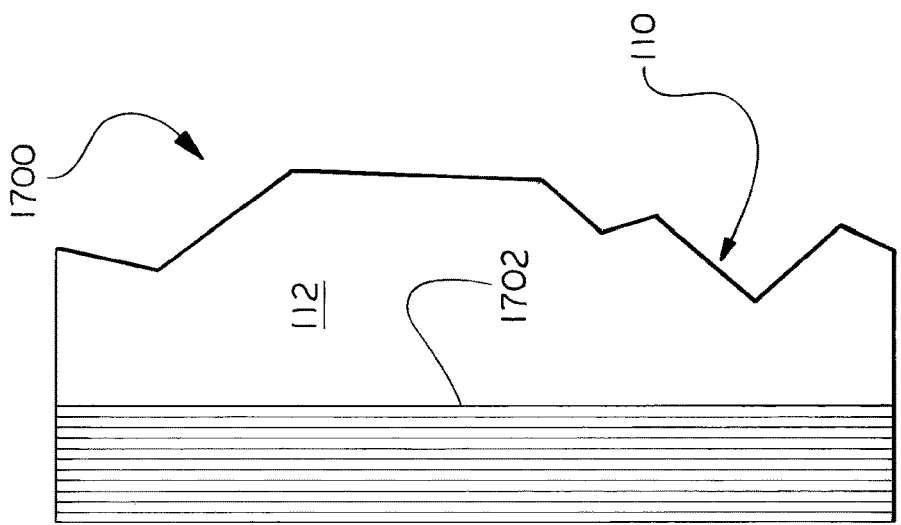

MECHANICAL DIMPLING FOR VAPOR EXPRESSION IN WELDING

TECHNICAL FIELD

The present disclosure relates generally to welding and, more particularly, to systems and methods for facilitating expression of unwanted vapor by-product in welding materials such as zinc.

BACKGROUND

Welding is a common way to join similar and dissimilar materials in a wide range of industries. Energy for welding can be applied in a variety of ways, such as by laser or ultrasonic vibrations.

In automotive manufacturing, steel or metal, such as aluminum, are being used. There is an increasing need and challenges associated with welding various materials together.

Workpieces to be joined by welding include those for instrument and door panels, lamps, air ducts, steering wheels, upholstery, truck beds or other vehicle storage compartments, upholstery components, external parts, and engine components, for instance. Regarding engine components, and other under-the-hood (UTH) applications, for example, workpieces are configured and developed continuously to withstand hot and/or chemically aggressive environments.

Regarding external parts, such as fenders, workpieces are being developed that can be painted on an assembly line and have high heat and chemical resistance over longer periods of time. And many other potential usages in automotive applications are being considered continuously.

Some materials express unwanted gas or vapor when melted in welding. Workpieces comprising zinc can have this characteristic. These workpieces can include steel coated with zinc, for example, or coated with a combination of zinc and aluminum. Workpieces are coated in these ways to provide benefits such as to provide high corrosion resistance for the resulting component.

The unwanted vapor is highly pressurized when generated in the joint being formed and must escape the surrounding molten material. Turning to the figures, and more particularly to the first figure, FIG. 1 shows an example prior art arrangement 100 in which a first workpiece 110 is being joined to a second workpiece 120. Material melted is indicated by numeral 130. The material is melted by welding energy applied (by laser, for example) to a heat-affected zone 140 (HAZ) of the arrangement 100, and the pressurized vapor is shown by numeral 150.

In some cases, the high-pressure vapor 150 forms unwanted blow holes in the molten metal to escape, such as that shown schematically in FIG. 2 with reference numeral 200. It is also possible that vapor 150 could get trapped in the molten material as it is cools.

Previous efforts to facilitate expression of the gas from the melted material in other ways are not as effective as desired and/or are costly in terms of equipment and process.

SUMMARY

The present disclosure relates to methods for welding together two workpieces. At least one of the workpieces comprises a material, such as zinc or zinc and aluminum, which expresses an unwanted vapor when melted during welding.

The method includes stamping, using a stamping system, a first workpiece at a first preselected region of the first workpiece to form a plurality of depressions or dimples. The method also includes positioning the first preselected region adjacent a corresponding region of a second workpiece. After stamping and positioning as such, the method includes applying energy to the first preselected region and the second preselected region to melt material of the first and second workpieces to form a joint connecting the two workpieces.

Based on the configuration and arrangement created, any vapor formed by melted material, such as zinc or zinc and aluminum, vents from the joint being formed, between the depressions formed, and away from the first and second workpieces.

Other aspects of the present invention will be in part apparent and in part pointed out hereinafter.

DESCRIPTION OF THE DRAWINGS

FIG. 1 illustrates schematically a prior art arrangement of two workpieces being welded together.

FIG. 2 illustrates the arrangement of FIG. 1 after vapor formed by melting material escapes in an unwanted manner, from a top of the weld being formed.

FIGS. 3-7 illustrate a first workpiece stamped according to various embodiments of the present disclosure.

FIGS. 8-12 illustrate side cross sections of workpieces being welded, through various steps, any of which can be automated.

FIGS. 13 and 14 show schematically stamping machinery, including related actuating and controlling equipment, according to various embodiments.

FIG. 15 shows an example controller for use in automated functions described herein.

FIG. 16 shows methods of performing functions of the present technology.

FIG. 17 shows an arrangement in which depressions are formed in stripes in one direction.

FIG. 18 shows an arrangement in which depressions are formed as stripes in another direction.

FIG. 19 shows an arrangement in which depressions are formed in a hatch pattern.

Figure 7:
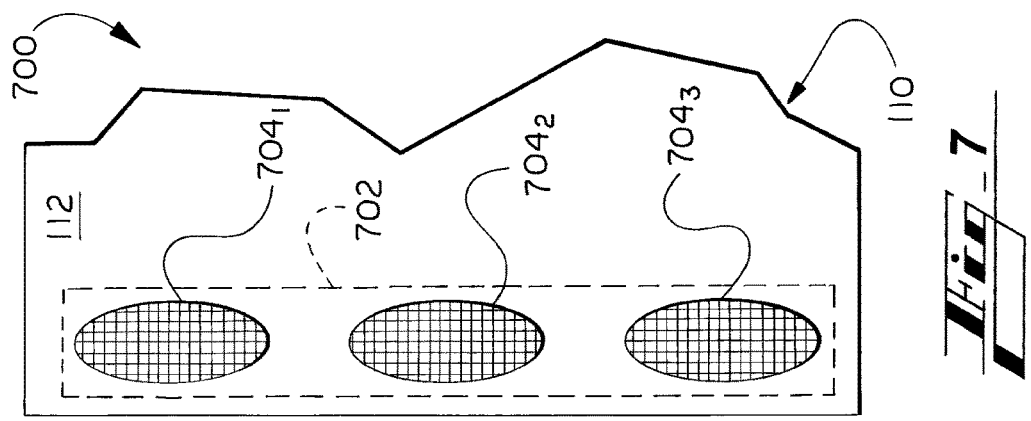

The figures are not necessarily to scale and some features may be exaggerated or minimized, such as to show details of particular components. In some instances, well-known components, systems, materials or methods have not been described in detail in order to avoid obscuring the present disclosure.

Specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model, or pattern.

Specific structural and functional details disclosed herein are not to be interpreted as limiting, but merely as a basis for the claims and as a representative basis for teaching one skilled in the art to employ the present disclosure.

While the present technology is described primarily herein in connection with automobiles, the technology is not limited to automobiles. The concepts can be used in a wide variety of applications, such as in connection with aircraft and marine craft.

I. FIGS. 3-7, 13, and 14

Turning again to the figures, and particularly the third figure, FIG. 3 shows an arrangement 300 comprising the first workpiece 110. The workpiece 110 is illustrated with a first side 112 showing. The first side 112 can be referred to as a faying surface.

A predetermined area 302 of the workpiece 110 is mechanically dimpled to form an area of one or more vapor-evacuation areas 304. The evacuations areas 304 and concavities and/or protrusions therein are shown in greater detail in FIGS. 8-12.

Concavities in the concavity area 304 can be referred to by other terms, such as depressions, or dimples. Predetermining the area to be dimpled can, but need not, be performed by computer processing.

By forming depressions, or low portions, high portions are formed between the low portions. When a tooth from a mechanical-stamping system presses into the faying surface, for instance, some of the surface material around the depression can rise with respect to the original surface (e.g., from the original surface plane). The high portions, or protrusions, can facilitate the outgassing described herein alone, or in conjunction with outgassing by the low portions. The high areas form gaps between them for these purposes. The low and high portions are called out in FIGS. 8-12.

The vapor-evacuation areas 304 are formed by deforming the first surface 112 of the workpiece 110 using the mechanical-stamping instrument or system. Example mechanical-stamping systems 1300, 1400 are shown schematically (not to scale) in FIGS. 13 and 14.

While the body of the stamping systems 1300, 1400 is shown square in the FIGS. 13 and 14, bodies of the systems can have any of a wide variety of shapes. In a contemplated embodiment, for instance, a stamping surface is curved, such as by comprising a round or arched portion, and is rolled against the workpiece 110 to form the gas-evacuation depressions.

The mechanical-stamping systems 1300, 1400 include multiple protrusions 1302, 1402, such as teeth. The protrusions 1302, 1402 in various embodiments have any of a wide variety of shapes, sizes, number, and inter-teeth spacing depending on the desired shape, size, number, and spacing of vapor-evacuation areas 304 to be formed in the workpiece 110.

In one embodiment, the teeth are shaped and applied to create resulting gaps between the workpieces 110, 120 when positioned together between about 0.1 and 0.5 mm, and in once case between about 0.2 and 0.3 mm.

In a contemplated embodiment (not shown), at least some of the protrusions 1302, 1402 differ in terms of at least one of shape, size, and spacing to an adjacent protrusion or protrusions.

The protrusions 1302 of the mechanical-stamping system 1300 of FIG. 13 are generally pointed. The protrusions 1402 of the mechanical-stamping system 1400 of FIG. 14 are generally rounded.

Any protrusions 1302, 1402 can have a profile or side that is rounded, such as by the protrusion 1302, 1402 being conical, with the point directed away from a base, or body of the stamping system 1300, 1400, toward the workpiece 110 being stamped. Or any protrusion 1302, 1402 could have a profile or sides can have corners, such as by the protrusion 1302, 1402 being a triangle-based, square-based, or other polygon-based pyramid.

In a contemplated embodiment, instead of each protrusion 1302, 1402 coming to a point, the protrusions 1302, 1402 includes an elongated tip. The point could be the elongated tip of a triangular prism, for instance. This embodiment is also considered illustrated by FIG. 13. This type of tooth 1302 would form a sharp-bottomed channel, groove, trough, or the like having a length equivalent to a length of the tooth 1302.

In another contemplated embodiment, the protrusion 1402 is similar to a triangular prism but has a rounded, elongated tip, such as by being half of a cylinder. This embodiment is considered illustrated by FIG. 14. This tooth 1402 would form a rounded channel, as long as the tooth 1402.

The example stamping systems 1300, 1400 can include or be connected to one or more actuating and controlling devices, such as those shown schematically in FIGS. 13 and 14 and referenced by numerals 1310. Actuating component(s) are referenced by numeral 1320. Controlling components are referenced by numeral 1330.

The actuating and controlling device 1310 can include or form an automated system, such as robotic machinery. The controlling device 1310 can include a computing device (e.g., computer) or other controlling circuitry or device.

In contemplated embodiments, the actuating and/or controlling components 1310, 1320 can be used also to actuate and/or control other systems used in methods of the present technology. The actuating and/or controlling components 1310, 1320 can also be used, for example, to actuate and/or control clamping machinery, biasing workpieces toward each other for welding. The actuating and/or controlling components 1310, 1320 can also be used, for example, to actuate and/or control welding equipment such as laser equipment, or ultrasonic-energy equipment, providing energy for welding.

FIGS. 4-7 show other arrangements of predetermined areas 402, 502, 602, 702 in which the workpiece 110 is mechanically dimpled to form respective areas of dimpling 404, 504, 604, 704.

As shown in FIG. 4, the arrangement can include multiple areas of dimpling $404_1$, $404_2$, $404_3$. The areas can be referred to by a variety of terms, such as dimpling area, depression area, stamping area, stamped area, or the like. While three areas are shown, the workpiece 110 can be impressed to form two or more than three dimpled areas 404.

Figure 6:
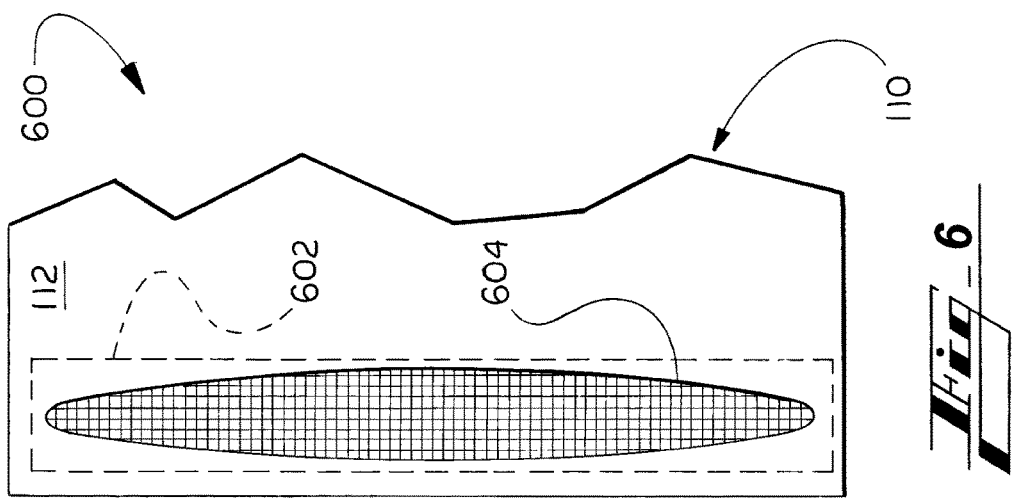
Figure 5:
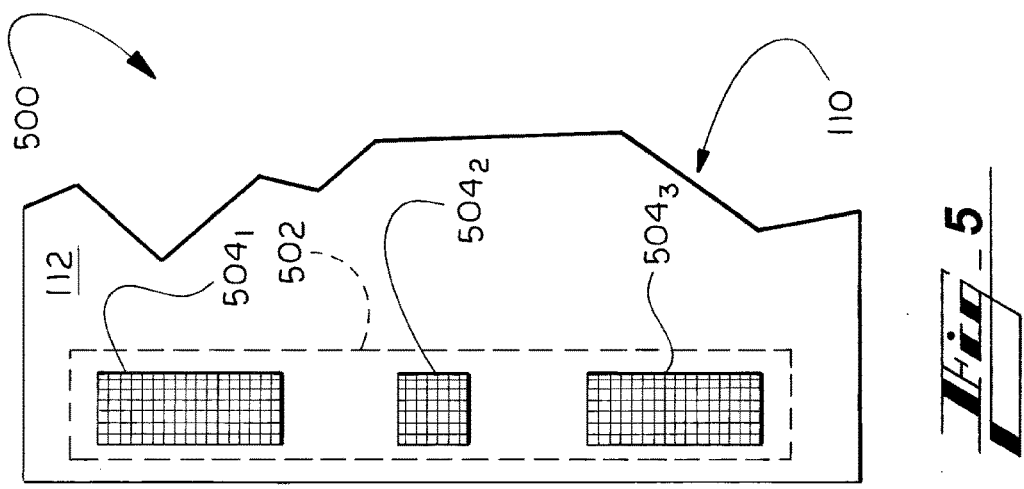

FIG. 5 shows multiple rectangular stamped areas, and particularly three of them $504_1$, $504_2$, $504_3$ having different sizes and rectangle shapes, as another example. FIG. 6 shows by way of example a single elongated, oval, stamped area 604, formed by one or more passes of the stamping system 1300, 1400. FIG. 7 shows multiple rectangular stamped areas, and particularly three of them $704_1$, $704_2$, $704_3$ having about the same size and oval shape, only by way of example.

Regarding the predetermined region 402, 502, 602, 702, each workpiece can be associated with more than one, such as one predetermined region associated with each area of dimpling 304, 404, 504, 604, 704. A first depression-area specific region 406 indicates this idea by showing the region 406 corresponding to only a first depression area 404.

II. FIG. 15—Controlling System

FIG. 15 shows an example controller or computer system 1500. The controller 1500 is in some embodiments part of a greater system 1501, such as a welding system.

As mentioned, the controller 1500 can be configured and arranged to control any of welding equipment, actuating equipment, clamping equipment, or other used herein, such as related sensors (e.g., temperature), fans, or pumps. The controller 1500 can be implemented in any of a variety of ways, such as in the form of a laptop computer, a server, within a mobile communications device, or other.

Although connections are not shown between all of the components illustrated in FIG. 15, the components can interact with each other to carry out system functions. Control functions can include the control functions mentioned or inferred herein, such as determining where to provide depressions on a workpiece, such as by way of controlling the stamping machine 1300, 1400. For this, the controller 1500 can include or be a part of the controlling system 1310 referenced above in connection with FIGS. 13 and 14.

As another example, control functions can include initiating stamping of the workpiece 110 using the stamping system 1300, 1400. Functions of the controller 1500 can include initiating application of welding energy, such as by way of a laser device. Another example, function includes initiating application of force to bias towards each other workpieces being joined, such as by way of a clamping or uni-directional force actuator.

As shown, the controller 1500 includes a memory, or computer-readable storage device 1502, such as volatile medium, non-volatile medium, removable medium, and non-removable medium. The term computer-readable media and variants thereof, as used in the specification and claims, refer to tangible or non-transitory, computer-readable storage devices.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The controller 1500 also includes a processing hardware unit 1504 connected or connectable to the computer-readable storage device 1502 by way of a communication link 1506, such as a computer bus.

The processing hardware unit 1504 can include or be multiple processors, which could include distributed processors or parallel processors in a single machine or multiple machines. The processing hardware unit can be used in supporting a virtual processing environment. The processing hardware unit could include a state machine, application specific integrated circuit (ASIC), programmable gate array (PGA) including a Field PGA, or state machine. References herein to the processing hardware unit executing code or instructions to perform operations, acts, tasks, functions, steps, or the like, could include the processing hardware unit performing the operations directly and/or facilitating, directing, or cooperating with another device or component to perform the operations.

The computer-readable storage device 1502 includes computer-executable instructions, or code 1508. The computer-executable instructions 108 are executable by the processing hardware unit 1504 to cause the processing hardware unit, and thus the controller 1500, to perform any combination of the functions described in the present disclosure. Functions can include controlling a manner by which any of the described operations are performed, such as a timing by which they are performed, or timing, such as when the operation is started, how long it is performed, and when it is stopped.

The controller 1500 further comprises an input/output (I/O) device 1510, such as a wireless transceiver and/or a wired communication port.

In some embodiments, the controller 1500 includes circuitry without computer code. In other embodiments, the controller 1500 includes a processing hardware unit 1504 that, executing the instructions 1508, sends and receives signals or information. Information can be transferred in the form of messages or packetized data. In various embodiments, the processing hardware unit 1504 communicates with one or more communication networks 1512, such as the Internet. Communications may include instructions for operation or a software update.

In some embodiments, such as when the system 1500 is implemented within more than one aspect of the stamping, clamping, and welding processes, the controller 1500 includes or is connected to one or more local and/or output devices 1514. The processing hardware unit 1504 can send and receive signals or messages to/from the devices 1514 wirelessly or by wire.

Input devices 1516 can include sensors associated with processes described herein, such as the dimple-stamping equipment, clamping equipment, and welding equipment. The controller 1500 may receive from a temperature sensor feedback, wirelessly or by wire, about a temperature of the workpieces or weld area during welding, and use the feedback to determine whether welding energy being applied, such as by laser, should be lowered or stopped.

Output devices 1518 can include any of the equipment, components, or machinery described herein, such as the dimple-stamping equipment, clamping equipment, and welding equipment.

Functions of the controller 1500 are described further below in connection with the methods of FIG. 16.

III. FIG. 16 and Supporting FIGS. 8-15—Methods of Operation

FIG. 16 shows algorithm or method 1600 by which the present technology is implemented, outlined by flow chart 1600 associated with welding together two workpieces wherein one is mechanically dimpled to promote evacuation of vapor formed in melting workpiece material during joint formation. In describing the methods 1600, reference is made to the illustrations of FIGS. 8-12.

It should be understood that operations of the method 1600 is not necessarily presented in any particular order and that performance of some or all the operations in an alternative order is possible and is contemplated. The operations have been presented in the demonstrated order for ease of description and illustration. Operations can be added, omitted and/or performed simultaneously without departing from the scope of the appended claims.

It should also be understood that the illustrated method 1600 can be ended at any time. In certain embodiments, some or all operations of this process, and/or substantially equivalent operations are performed by execution of computer-readable instructions stored or included on a computer readable medium, such as the memory 1602.

The method 1600 shown can thus be viewed to include multiple methods, or sub-processes.

The method 1600 begins 1601 and flow proceeds to block 1602, whereat two workpieces 110, 120 are provided. The workpieces 110, 120 can comprise any of a wide variety of materials. In various embodiments, one or both of the workpieces 110, 120 comprise steel. In some embodiments, one or both of the workpieces 110, 120 comprise zinc or a combination of zinc and aluminum. For instance in one case, the workpieces 110, 120 comprise steel coated or plated with zinc or a combination of zinc and aluminum.

The workpieces 110, 120 shown in FIGS. 3-12, are considered to show schematically the various embodiments, such as wherein one or both workpieces 110, 120 comprise a single material, more than one material combined, and/or a coating or plating. Regarding the coating, for instance, the surfaces 112, 122 referenced in FIGS. 3-12 can be considered to include the coating.

As provided, the first side 112 can be referred to as a faying surface. The term faying surface can be used herein to describe whichever surfaces 112, 122 are treated according to the present technology. In some cases, the term faying surface could be used more generally to refer to both surfaces 112, 122 being connected, even if just one is treated.

According to the method 1600, at least one of the workpieces will be mechanically impressed by a tool or device, such as by stamping, to form a plurality of depressions.

While workpiece can be mechanically deformed in a variety of ways, the process is referred to primarily herein as mechanical stamping, or just stamping. References below to stamping should not necessarily limit the manner by which the workpieces are mechanically deformed.

And while both workpieces 110, 120 can be stamped, for simplicity the description below describes primarily embodiments in which the first workpiece 110 is stamped. The descriptions are intended, then, to encompass implementations in which both workpieces 110, 120 to be joined are deformed.

At block 1604, the workpiece 110 is positioned for stamping. In a contemplated embodiment, the positioning is performed at least in part by automated machinery, such as one or more robots. The positioning machinery is controlled at least in part by a controller, such as the controller 1500 of FIG. 15. The positioning machinery can thus be considered as an output 1518 described above in connection with FIG. 15.

Positioning the workpiece 110 for stamping can include selecting or determining one or more regions of the workpiece 110 to be deformed (e.g., dimpled) by stamping. The determination can be performed in part or fully by a controller, such as any of the controllers 1330, 1430, 1500 mentioned above.

As provided, determining the area can, but need not, include computer processing. The area can be predetermined, for instance, simply by a person positioning the workpieces and/or the stamping equipment for the stamping.

With reference to FIG. 3, an example workpiece arrangement 300 is shown. An example region to be stamped is referenced by numeral 302. The region 302 is on a first side 112 of the workpiece 110. The first side 112 of the workpiece 110 will be positioned opposite a first side 122 of the joining workpiece 110 (see e.g., FIG. 8).

In some implementations, the region 302 for stamping is adjacent an edge 303 of the workpiece 110. This would be the case when, for example, the joint to be formed is a lap joint, whereby ends of respective workpieces 110, 120 are welded together. The stamped area can reach near or all the way to one or more edges 303 as shown by way of example by stamped areas $404_2$, $404_3$.

In some implementations, the region for stamping encompasses more than one area in which stamping will be done, such as indicated by region 402 in FIG. 4. In some implementations, each region of one or more regions for stamping at the workpiece 110 coincides with one area in which stamping will be done, such as indicated by region 302 in FIGS. 3 and 406 in FIG. 4.

The overlapping regions $404_1$, 402 shown in FIG. 4 are for teaching purposes, and only one of them would be present in implementation.

The regions for stamping 302, 402, etc. could be defined—e.g., shaped and located—and determined in any of a variety of manners. The regions can be defined by an x-y coordinate, for instance, corresponding to a center of the area in which stamping will be performed, or a coordinate of a central line of the area in which stamping will be performed. In a contemplated embodiment the region is defined by a radius about a target weld location. Positioning software can use computer-aided design or engineering (CAD; CAE) math data.

The regions 302, 402, etc. can have any of a variety of shapes, such as by being shaped generally as the areas to be stamped. This shape can correspond, for instance, to a shape of the stamping system to be used, and a manner (e.g., pattern, direction, location) in which the stamping is performed.

At block 1606, the stamping is performed. The stamping is performed using a stamping tool or system, such as the stamping systems 1300, 1400 shown schematically in FIGS. 13 and 14. The stamping system 1300, 1400 can include or be connected to a controller, as mentioned regarding controllers 1330, 1430, 1500. The stamping system is described further above in connection with FIGS. 13 and 14.

In a contemplated embodiment, the stamping is performed at least in part by automated machinery, such as one or more robots, such as machinery controlled by the controller 1500 of FIG. 15. The machinery can thus be considered as an output 1518 described above in connection with FIG. 15.

The workpiece 110 being stamped can include steel and zinc, as only examples. In one embodiment, the workpiece 110 comprises steel coated with zinc or zinc and aluminum. As also provided, the workpieces 110, 120 shown in FIGS. 3-12, are considered to show schematically the various embodiments, such as wherein one or both workpieces 110, 120 comprise a single material, more than one material combined, and/or a coating or plating.

The stamping is performed on a first surface 112 of the workpiece 110 at the preselected region—e.g., at region 302, 406, 502, etc.—to deform the coating, forming gas-evacuation depressions. For embodiments in which the workpiece 110 is coated, the stamping is performed to deform the coating, forming gas-evacuation depressions.

In a contemplated embodiment in which a coating is present, the stamping forms depressions in the coating and to some degree underlying material—e.g., a zinc or zinc/aluminum coating and underlying steel.

The area(s) of stamping—e.g., areas 304, $404_1$, $404_2$, etc.—can be formed to have any of a variety of shapes, sizes, and number. In one embodiment, the size is slightly larger than an area that the weld will cover. In another embodiment, it is about the same size as the planned weld. A total coverage—360 degree coverage, for example—is in some embodiments preferred, whereby high and low portions from the mechanical dimpling are present at generally all locations at and/or adjacent an edge of the weld being formed.

In one embodiment, shape of the stamp area resembles an exaggerated stich for instance. In another case, the shape is generally round or circle.

FIG. 3 shows by way of example a single elongated, rectangular, stamping or stamped area 304, formed by one or more passes of the stamping system 1300, 1400.

FIG. 4 shows multiple rectangular stamped areas, and particularly three of them $404_1$, $404_2$, $404_3$ having about the same size and rectangle shape, by way of example.

FIG. 5 shows multiple rectangular stamped areas, and particularly three of them $504_1$, $504_2$, $504_3$ having different sizes and rectangle shapes, as another example.

FIG. 6 shows a single elongated, oval, stamped area 604, formed by one or more passes of the stamping system 1300, 1400. FIG. 7 shows multiple rectangular stamped areas, and particularly three of them $704_1$, $704_2$, $704_3$ having about the same size and oval shape, only by way of example.

Regarding shape of the depressions formed, the depressions will be shaped generally according to shape, size, and manner of application (e.g., force and direction of application) of the teeth of the stamping system. As provided, in various embodiments at least one of the depressions can be shaped like a channel, groove, trough, or the like, with a smooth or sharp bottom, depending on the tooth shape, and having a length equivalent to a length of the tooth.

The depressions can be formed in a pattern, such as stripes, crisscross or hatch, based on the size, shape, and spacing of the teeth. FIG. 17 shows an arrangement 1700 in which depressions 1702 are formed in stripes in one direction, FIG. 18 shows an arrangement 1800 in which depressions 1802 are formed as stripes in another direction, and FIG. 19 shows an arrangement comprising an example hatch pattern 1902.

At block 1608, the workpieces 110, 120 to be joined are positioned adjacent each other for welding.

In a contemplated embodiment, the positioning is performed at least in part by automated machinery, such as one or more robots. The positioning machinery is controlled at least in part by a controller such as the controller 1500 of FIG. 15. The positioning machinery can thus be considered as an output 1518 described above in connection with FIG. 15.

FIG. 8 shows a side cross-section of the two workpieces 110, 120 positioned adjacent each other. The view shows the workpieces 110, 120 after the first workpiece 110 has been stamped. Depressions, or dimples, in the first surface 112 of the first workpiece 110 are indicated by reference numeral 820.

As provided, by forming depressions 820, or low portions, high portions are formed between the low portions. The high portions are indicated generally by reference numeral 822. As with all features, the depressions 820 and protrusions 822 are illustrated schematically and can have any of a wide variety of geometries. Each protrusions 822 can be shorter than shown, or shorter than adjacent depressions 820 are deep, for instance. And some or all of the depressions 820 and the protrusions 822 can have shapes other than the generally smooth rounded shapes shown by way of example.

FIG. 8 is considered to show various relative positioning arrangements, such for the lap joint described above.

The view of FIGS. 8-12 are not intended to limit the orientation by which the workpieces are positioned adjacent each other for welding at block 1608. The positioning in embodiments includes positioning some or all of one of the workpieces (e.g., the first 112) on top of some or all of the other (e.g., the second 112). The positioning can include other arrangements, such as positioning the workpieces 110, 120 adjacent each other laterally for the welding.

While the stamped workpiece 110 is shown below the second workpiece 120 in the view of FIGS. 8-12, the stamped workpiece 110 could have been positioned on above the second workpiece 120 instead.

As mentioned, in a contemplated embodiment both workpieces 110, 120 are stamped. The workpieces 110, 120 in this case can be stamped at or adjacent opposing weld areas—i.e., areas that will directly oppose each other after the workpieces are positioned for welding. Each stamped portion of one of the workpieces need not, though, be positioned so that it opposes a stamped region of the other workpiece when the workpieces are positioned for welding.

The first workpiece 110 can be stamped at a region corresponding to where a first welding will be performed, for instance, but not the second workpiece 120 in a corresponding, opposing, region of the second workpiece 120; and the second workpiece 120 can be stamped at a region corresponding to where a second welding will be performed, but not the first workpiece 110 in a corresponding region of the first workpiece 110.

At block 1610, the method 1600 includes biasing at least one of the workpieces 110, 120 toward the other. In one embodiment, the biasing comprises clamping the workpieces together.

The biasing can include applying force to the first workpiece 110 in a direction generally towards the second workpiece 120 positioned opposite the first workpiece 110 and/or applying force to the second workpiece in a direction generally towards the first workpiece 110. In one embodiment, one of the workpieces 110, 120 are secured from moving in at least one direction, or grounded physically, such as by an anvil, table, or floor (not shown in detail).

Regions of the workpieces to be welded together, whether both are stamped, can be referred to as preselected regions. A region that is stamped and then welded can be preselect in two ways—for stamping and for the welding at the region.

In a contemplated embodiment, the positioning is performed at least in part by automated machinery, such as one or more robots. The positioning machinery is controlled at least in part by a controller such as the controller 1500 of FIG. 15. The machinery can thus be considered as an output 1518 described above in connection with FIG. 15.

FIG. 9 indicates opposing forces by reference numerals 902, 904. The second force 904 can be provided effectively by an anvil, for instance. The forces can be applied in any of a variety of locations, magnitudes, and the like as determined appropriate to facilitate effective welding, such as directly or further adjacent the regions of the first and second workpieces 110, 120 to be joined.

At section 1612, with the workpiece(s) stamped and the workpieces positioned adjacent each other, and possibly pressed together, the workpieces 110, 120 are welded together.

Any one or more of the functions of section 1612 are, in various embodiments, performed at least in part by automated machinery, such as one or more robots. The machinery includes welding equipment, such as a laser-welding system. The welding machinery is controlled at least in part by a controller such as the controller 1500 of FIG. 15. The welding machinery can thus be considered as an output 1518 described above in connection with FIG. 15.

In the welding operation, at block 1614, energy, such as laser energy, is applied to at least one of the workpieces 110, 120 at one or more regions to be welded. Welding energy being applied is shown schematically by reference numeral 906 in FIG. 9.

In a contemplated embodiment, a connection-facilitating component (not shown), such as a stud, punch, or energy director is provided. The connection-facilitating component can be positioned between the workpieces 110, 120, for instance. The connection-facilitating component can be punched, inserted, or otherwise positioned so that it extends at least partially into one or both workpieces 110, 120. The component may include material that forms unwanted vapor when formed, such as zinc or zinc and aluminum. Once in place, the connection-facilitating component can be considered a part of one or both workpieces. Reference in the claims below, for instance, to applying energy to a workpieces, or melting the workpieces, can include doing the same to such a connection-facilitating component.

During the welding, vapor, gas, or the like may be formed in the workpiece material 1000 being melted. The vapor is indicated schematically by reference numeral 150 in FIG. 10.

For instance, highly pressurized zinc vapor may be formed in implementations in which at least one of the workpieces includes steel coated with zinc or a combination of zinc and aluminum.

This vapor or gas would traditionally not have a way to escape the heat-affected zone (HAZ) 140 (FIG. 1), and more particularly molten material of the joint being formed. As shown in FIG. 2, this can cause a blow hole.

According to the present technology, the mechanically-formed depressions 820 create spacing between the workpieces 110, 120. Spacing is created by high and/or low points (e.g., peaks and/or troughs) formed by the depressions formed. By the spaces, the vapor 150 can escape from the molten material 1000, between the workpieces 110, 120, and to an exterior of the workpieces 110, 120, such as to an ambient environment in which the welding is being performed. In a contemplated embodiment, escaping or evacuated vapor is pumped or otherwise moved away from the welding environment, such as by an intake nozzle and tubing (not shown). The escaping can be referred to by other terms such as outgassing or venting.

It is contemplated that all or substantially all vapor will be outgassed. The amount outgassed is sufficient to allow the resulting weld to pass applicable strength standards.

With continued reference to the figures, FIG. 11 illustrates the idea that the vapor 150, being pressurized, finds the path of least resistance, which is out of the molten material by way of the spacing. FIG. 11 indicates the vapor evacuating the molten material by dashed lines referenced by numeral 1100.

The functions of blocks 1616, 1618, described next, can be performed before, during, and/or after the functions of block 1614.

In a contemplated embodiment indicated by block 1616, a negative pressure is applied to the environment including the welding area, such as by creation of a vacuum. The negative pressure is applied during welding to promote evacuation 1100 of the vapor 150 from the molten material 1000 by way of the spacing formed by the depressions 820 and/or to promote evacuation of the vapor 150 from around the workpieces. The negative pressure can be provided in any of a variety of ways, such as by a vacuum system and/or a fan system. A fan can blow air away from the welding area, for instance, whether a vacuum is maintained around the welding area. Air can be focused, using a nozzle or tubing, for instance, to facilitate desired evacuation.

In another contemplated embodiment, indicated by block 1618, a positive pressure is applied to an environment including the welding area, such as a vacuum. The positive pressure is applied during welding to promote evacuation 1100 of the vapor 150 from the molten material 1000 by way of the spacing formed by the depressions 820. The positive pressure can be applied in any of a variety of ways, such as by a fan blowing air at, to, or over an area in which the welding is being formed. Again, air can be focused, using a nozzle or tubing, for instance, to facilitate the evacuation as desired.

At block 1620, application of the welding energy is ceased and the molten material is allowed and/or caused to cool. The resulting arrangement and the joint are indicated schematically in FIG. 12 by reference numerals 1200, 1210, respectively.

The process can end 1621, or be repeated as indicated by return path 1623, such as in connection with the same or a next set of workpieces 110, 120.

IV. Select Benefits of the Present Technology

Many of the benefits and advantages of the present technology are described directly or inherently above. The present section restates some of those and references some others. The benefits are provided by way of example, and are not exhaustive of the benefits of the present technology.

The technology taught herein allows formation of robust welds. The welds do not have blow holes from vapor that would otherwise build up in the weld during formation. The welds also do not have such vapor locked in the weld.

The structural configurations and arrangements provided, including a stamping system and process, allow evacuation of vapor from melted material without the vapor blowing out of the weld.

As a further advantage over conventional methods, the structural configurations and arrangements taught can be implemented successfully at relatively low cost. Prior efforts to solve the challenges described have been less successful and/or are costly in terms of equipment and process investments required. The higher cost of prior techniques include but is not limited to cost of equipment and energy. For pre-welding laser treatment, for instance, the equipment required is very expensive. Even if the same equipment used for laser welding can be used for pre-welding treatment, ancillary components required are expensive, such as generator, chiller, and optic components.

Forming depressions mechanically also has advantages including the flexibility with which the depressions can be formed, such as in any desired shape, such as a rounded- or sharp-bottomed groove or dimple, for example.

V. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A method, for welding together a first workpiece and a second workpiece, comprising:
   stamping, using a stamping system, a faying surface of the first workpiece at a plurality of preselected regions of the faying surface to form a plurality of depressions and protrusions in each of the plurality of preselected regions;
   positioning at least one of the plurality of preselected regions adjacent a second preselected region of the second workpiece; and
   applying energy to the at least one of the plurality of preselected regions and the second preselected region to melt material of the first and second workpieces to form a joint connecting the first workpiece to the second workpiece, wherein vapor formed by workpiece material being melted vents from the joint being formed, between the depressions and/or corresponding protrusions formed on the faying surface, and away from the first and second workpieces.

2. The method of claim 1, wherein:
   the stamping system comprises a plurality of teeth used in forming the depressions; and
   each tooth has a tip being a first portion of the tooth contacting the faying surface of the first workpiece being stamped.

3. The method of claim 2, wherein the tip of at least one of the teeth is elongated and the depression formed by the tooth comprises a corresponding elongated groove.

4. The method of claim 2, wherein each of the protrusions has a polygon-based pyramid shape.

5. The method of claim 2, wherein each of the protrusions has a triangle-based shape.

6. The method of claim 1, wherein the stamping system comprises a steel punch having a punch face comprising a plurality of teeth forming the depressions.

7. The method of claim 1, wherein stamping the first workpiece plastically deforms the first workpiece in the plurality of preselected regions to form the depressions.

8. The method of claim 1, wherein:
   a first preselected region in the plurality of preselected regions extends to or is adjacent a first edge of the first workpiece and a second preselected region in the plurality of preselected regions extends to or is adjacent a second edge of the second workpiece and first portions of the first workpiece do not overlap portions of the second workpiece; and
   the joint formed is a lap joint.

9. The method of claim 1, further comprising applying force to at least one of the first and second workpieces to bias the first and second workpieces toward each other during application of the energy to a first preselected region and a second preselected region in the plurality of preselected regions.

10. The method of claim 1, wherein applying energy comprises applying a laser to the first and second workpieces.

11. The method of claim 1, wherein at least one of the two workpieces comprises zinc, and the vapor is formed at least in part by the zinc when melting.

12. The method of claim 11, wherein:
   the depressions are first depressions;
   the method further comprises stamping, using the stamping system, the second workpiece to form a plurality of second depressions; and
   the vapor formed by zinc being melted is vented from the joint being formed, between the first depressions and the second depressions, and away from the first and second workpieces.

13. The method of claim 11, wherein the first workpiece comprises steel coated with zinc.

14. The method of claim 11, wherein the first workpiece comprises steel coated with a combination of zinc and aluminum.

15. The method of claim 11, wherein the first workpiece and the second workpiece comprise steel coated with zinc.

16. The method of claim 11, wherein the first workpiece and the second workpiece comprise steel coated with a combination of zinc and aluminum.

17. The method of claim 1, further comprising promoting venting of the vapor from the joint being formed, comprising applying negative pressure to an environment of the first and second workpieces.

18. The method of claim 1, further comprising promoting venting of the vapor from the joint being formed, comprising causing air to move in an environment of the first and second workpieces.

19. A method, for preparing a first workpiece for being welded to a second workpiece, comprising:
   stamping, using a stamping system, a faying surface of the first workpiece at a plurality of preselected regions of the faying surface, to form a plurality of depressions and protrusions in the plurality of preselected regions;
   wherein the stamping system comprises a plurality of teeth forming the depressions; and
   wherein each tooth has a tip being a first portion of the tooth contacting the workpiece being stamped.

20. A method, for preparing a first workpiece for being welded to a second workpiece, comprising:
   stamping, using a stamping system, a faying surface of the first workpiece at a plurality of preselected regions of the faying surface to form a plurality of depressions and protrusions in the plurality of preselected regions;
   wherein the stamping system comprises a steel punch comprising a punch face including a plurality of teeth for forming the depressions.

* * * * *